United States Patent [19]
Walton et al.

[11] Patent Number: 5,519,858
[45] Date of Patent: May 21, 1996

[54] ADDRESS RECOGNITION ENGINE WITH LOOK-UP DATABASE FOR STORING NETWORK INFORMATION

[75] Inventors: Andrew Walton, Reading, England; Una M. Quinlan, Dublin, Ireland; Stewart F. Bryant, Redhill, England; Michael J. Seaman, San Jose, Calif.; John Rigby, Reading, England; Fearghal Morgan, Moycullen; Joseph O'Callaghan, Glounthaune, both of Ireland

[73] Assignee: Digital Equipment Corporation, Maynard, Mass.

[21] Appl. No.: 819,490

[22] Filed: Jan. 10, 1992

[51] Int. Cl.$^6$ .................................................. G06F 17/30
[52] U.S. Cl. .................. 395/600; 364/251.6; 364/255.3; 364/255.7; 364/963.3; 364/DIG. 1; 395/412
[58] Field of Search .................................. 395/200, 275, 395/425, 600, 400

[56] References Cited

U.S. PATENT DOCUMENTS

| | | | |
|---|---|---|---|
| 4,468,728 | 8/1984 | Wang | 395/600 |
| 4,611,272 | 9/1986 | Lomet | 395/600 |
| 4,644,468 | 2/1987 | Doster et al. | 395/200 |
| 4,694,396 | 9/1987 | Weishaar et al. | 395/200 |
| 5,032,987 | 7/1991 | Broder et al. | 395/425 |
| 5,146,560 | 9/1992 | Goldberg et al. | 395/200 |
| 5,202,986 | 4/1993 | Nickel | 395/600 |

OTHER PUBLICATIONS

Pei et al., "VLSI Implementation of Routing Tables: Tries and CAMs," Proceeding of Tenth Annual Joint Conference of IEEE Computer and Communications Societies, vol. 2 1991, pp. 515–524.

Primary Examiner—Thomas G. Black
Assistant Examiner—Hosain T. Alam
Attorney, Agent, or Firm—Kenyon & Kenyon

[57] ABSTRACT

The present invention is directed to an address recognition apparatus including an address recognition engine coupled to a look-up database. The look-up database is arranged to store network information relating to network addresses. The look-up database includes a primary database and a secondary database. The address recognition engine accepts as an input a network address for which network information is required. The address recognition engine uses the network address as an index to the primary database. The primary database comprises a multiway tree node structure (TRIE) arranged for traversal of the nodes as a function of preselected segments of the network address and in a fixed sequence of the segments to locate a pointer to an entry in the secondary database. The entry in the secondary database pointed to by the primary database pointer contains the network information corresponding to the network address. The address recognition engine includes a table for storing a plurality of database specifiers. Each of the database specifiers contains control information for the traversal of the primary and secondary databases. In addition, each of the nodes in the primary database and each of the entries in the secondary database is provided with control data structures that are programmable to control the traversal of the database.

16 Claims, 8 Drawing Sheets

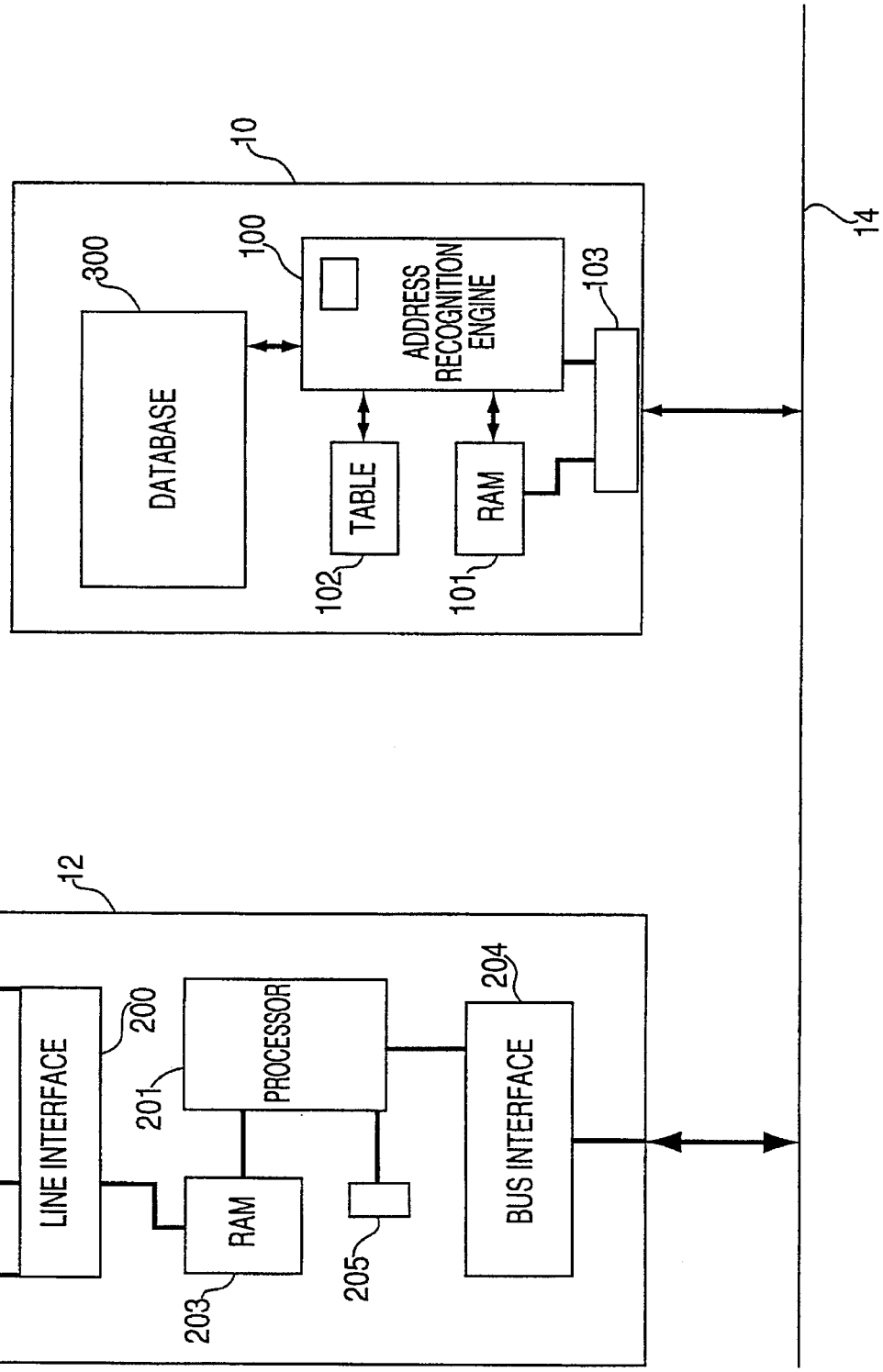

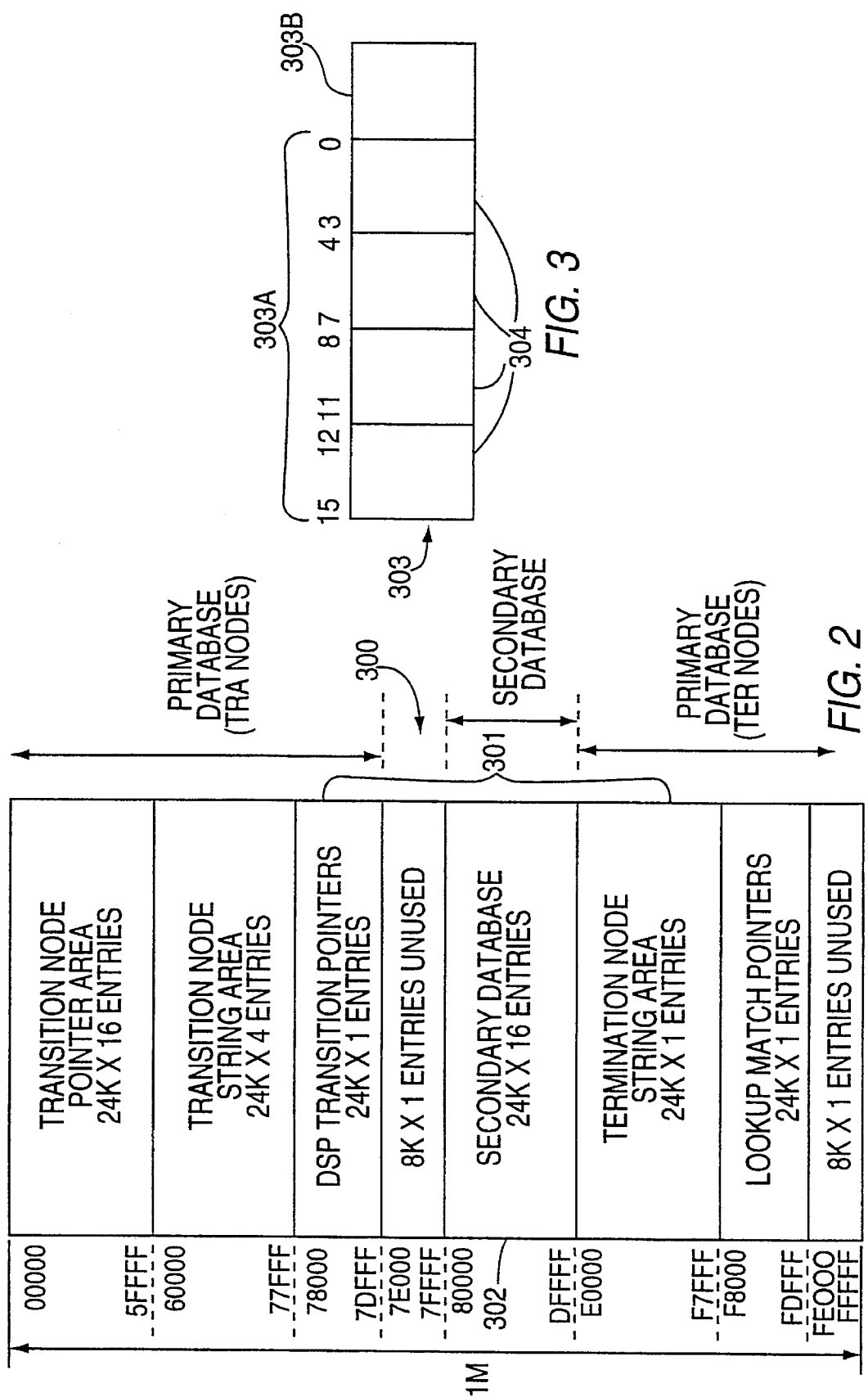

ADDRESS RECOGNITION ENGINE WITH LOOK-UP DATABASE FOR STORING NETWORK INFORMATION

FIELD OF THE INVENTION

The present invention is directed to computer networks and, more particularly, to an address recognition apparatus utilized for the storage and look-up of network address information.

BACKGROUND OF THE INVENTION

The capability of computers to communicate with one another has become a basic attribute of modern information processing. There is an ongoing proliferation of user applications that depend upon the ability of a computer running one of the user applications to send and receive data to and from other computers. The communication capability is necessary for the user application to be able to complete the task for which the application was developed or to communicate information to other users within a group or organization. A particular application may be designed, for example, to call subroutines running on another computer for certain data processing functions or to access a remote database to obtain input data or to store results.

An important objective in providing a communication capability among computers is to make all of the database and processing resources of the group or organization available to each user in the group or organization. In response to the growing need for sophisticated communication capabilities among computers, network, routing and bridging protocols such as IP, DECnet, OSI, standard ISO 8473, etc. have been developed to control data transmissions between computers linked to one another in a network. The various protocols are implemented in transmission services used to couple computers to one another.

Each protocol is typically defined in terms of a number of layers, with each layer relating to a certain aspect of the functionality required for data transmissions throughout a network. For example, the first three layers are defined as a physical layer, a data link layer and a network layer. The physical layer is directed to the physical and electrical specifications of a physical link, for example, a bus, that couples the computers of a network to one another. The physical layer controls bit transmissions through the link so that a series of bits of a data packet can be communicated from one computer on the network to another computer on the network. The physical layer will set the voltage levels for logical ones and zeros, the timing of stable bit information on a physical link and so on, as necessary to transmit the bits of a data packet over the physical link.

The data link layer is directed to the packaging or framing of bits received in a data transmission into a defined packet that is free of transmission errors. The data link layer creates and recognizes boundaries between bits to define bit fields. The bits between boundaries provide structure and meaning to the bits of a data packet. For example the data packet can include a header, comprising the first n bits of a transmission, for computer source and destination information, the length of the data packet in bytes, the network protocol being used and so on. The header can be followed by framed bytes of data comprising the actual message being communicated between two or more computers on the network.

The network layer is directed to the control of routing information required to direct a message from a source computer to a destination computer of the network. Each protocol will define the length and content for a network address to uniquely identify each source or destination of data packets and the processing scheme for routing a data packet through a network. The network address information is in one of the bit fields of a data packet, as framed by the data link layer processing scheme defined by the protocol.

Networks are generally arranged into local area networks (LANs) and wide area networks (WANs). A LAN couples computers that are physically located relatively close to one another, as for example in the same building. A WAN couples computers that may be located in different cities or indeed on different continents. A WAN usually includes components such as a router to receive a data packet from a computer on one LAN and to forward the data packet to a computer on another LAN.

The router processes a network address of a data packet according to a protocol implemented in the transmission service used on the network to determine how the data packet is to be routed, e.g., to another router directly coupled to the receiving LAN or to an intermediate router, etc. Each router stores information on the topology of the network for use in routing each data packet.

A bridge is another component that may be utilized to transfer data packets from computers of one LAN to computers of another LAN. A bridge intercouples different LANs and monitors communications within and between the LANs to "learn" source and destination address information. The bridge continuously learns and "ages" address information to accommodate the transfer of a data packet between the LANs.

Typically, each of the bridge and router components have access to a look-up database that contains bridging or routing information, respectively, relating to the network addresses of the sources and destinations of data in the particular network being serviced by the respective router or bridge. An address recognition engine can be implemented as a resource for a router or bridge for access to the look-up database.

The router or bridge operates to extract the network address from the header of a data transmission received at the router or bridge and inputs the address to the address recognition engine. The address recognition engine utilizes the input network address as an index for traversal of the look-up database to locate an entry corresponding to the network address. The entry contains protocol information required by the router or bridge for directing the data transmission to the designated destination.

As should be understood, the nature and content of the information that would be stored in a database entry depends upon whether a router or bridge were implemented in the network due to the differing operating characteristics of routing and bridging operations. Moreover, the size and format of the network address and the nature and content of the network information related to the network address in a particular network are defined by the network protocol implemented in the network. Accordingly, the structure of a look-up database must be designed to accommodate either bridging or routing as well as the address length and information content requirements of the protocol being utilized in the network were the bridge or router is operating. Thus, a look-up database designed to support a router in a network implementing, e.g., a DECnet protocol would not be suitable for use by a bridge, and so on.

SUMMARY OF THE INVENTION

The present invention provides an address recognition apparatus that is flexible in design and usable in routing and bridging operations in the context of various different networks protocols. In this manner, a single address recognition apparatus according to the present invention can service a router, a bridge or both simultaneously, and, at the same time support look-up operations for several different protocols. The address recognition apparatus is also structured to accommodate a large amount of network information data in an economical and efficient look-up scheme so that the address recognition apparatus can service a plurality of routing and bridging components as a shared resource.

Generally, the address recognition apparatus of the present invention comprises an address recognition engine coupled to a look-up database. The look-up database comprises a primary database and a secondary database. The address recognition engine accepts as an input the network address extracted from a data transmission. The address recognition engine uses the network address as an index to the primary database. The primary database comprises a multiway tree node structure (TRIE) arranged for traversal of the nodes as a function of preselected segments of the network address and in a fixed sequence of the segments to locate a pointer to an entry in the secondary database.

The TRIE structure has a predictable search time, does not require wide memory for comparisons of digit values to select a node pointer and can be implemented in an economical amount of memory space particularly in a sparsely populated address space, as is often the case in networks. Thus, the TRIE structure for the primary database provides fast access to a large amount of data as would be the case when the address recognition engine is to be used as a shared resource.

Each segment of the network address used as an index by the address recognition engines locates a node containing pointers to subsequent nodes, each pointer of a particular node being defined by one of the possible values of a subsequent segment of the address. The traversal of nodes starts at a root node and continues through a sequence of transition nodes according to the sequence of segments of the network address until a terminal or end node is reached. Each terminal node stores the pointer to the secondary database entry corresponding to the network address used to reach the terminal node. The entry in the secondary database pointed to by the primary database pointer contains information necessary for the router or bridge, as the case may be, to direct the data transmission towards its intended destination.

According to a feature of the present invention, the address recognition engine includes a table for storing a plurality of database specifiers. Each of the database specifiers contains control information for the traversal of the primary and secondary databases. The address recognition engine receives as an input, together with a network address, an index to identify one of the database specifiers stored in the table. The address recognition engine traverses the primary and secondary databases according to the control information contained in the database specifier indexed by the index accompanying the network address.

For example, different protocols define different address sizes, formats and other information items that may be stored in the entries of the secondary database. To accommodate different sizes of network addresses according to the formats of different protocols, the TRIE of the primary database is arranged to have multiple root nodes to provide several traversal paths, each able to accommodate a different size and address format from among the possible network addresses that can be input to the address recognition engine. Each database specifier includes information on the root node to be used for a particular network address.

Moreover, the database specifiers provide a mechanism for controlling what information from an entry in the secondary database is returned to a router or bridge in connection with a particular network address. Each entry can be arranged to store a wide range of information. The control information of the database specifiers are programmable to indicate what specific information should be returned during a specific look-up operation under the control of a particular database specifier. In this manner, sufficient information for any number of aspects of a particular protocol can be stored in the secondary database entries with only that information appropriate for a particular address look-up operation being read from the entry, as specified in the respective database specifier.

The database specifiers also provide specific control information for implementing various address matching techniques required by specific protocols and learning and ageing functions required for bridging operations so that a particular look-up operation can be controlled for either bridging or routing operation and simultaneously support address matching functions that may be required in a particular protocol.

In accordance with another feature of the address recognition apparatus of the present invention, each of the nodes in the primary database and each of the entries in the secondary database are provided with control data structures that are programmable to control the traversal of the database. The control data structures at the nodes and entries augment the control information contained in the database specifiers to further increase the flexibility of the database design for efficient look-up operations in an environment that handles bridging and/or routing operations in respect of various different protocols.

Thus, the address recognition apparatus of the present invention is sufficiently flexible to operate as a centralized, shared resource for several line cards, each operating as a router and/or bridge and each handling multiple network protocols.

BRIEF DESCRIPTION OF THE DRAWINGS

FIG. 1 is a block diagram of a high level representation of the architecture for an address recognition engine coupled to a line card operating as either a router or bridge within a computer network.

FIG. 2 is an exemplary memory map of the memory of the address recognition engine of FIG. 1.

FIG. 3 illustrates an example of a network address and database specifier input to the address recognition engine of FIG. 1.

DETAILED DESCRIPTION

Figure 4:
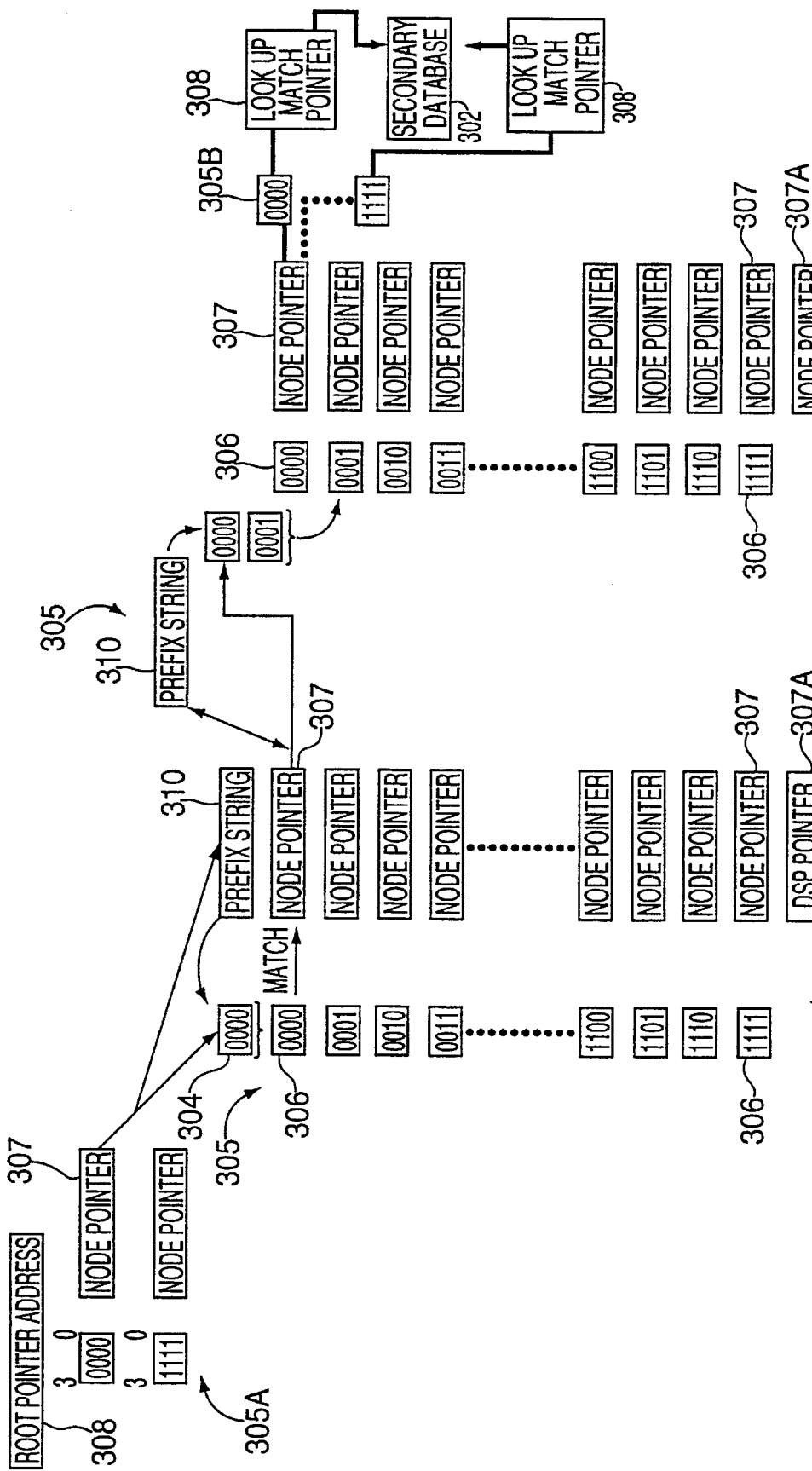
FIG. 4 is a schematic representation of the primary database of FIG. 2.

Referring now to the drawings, and initially to FIG. 1, there is illustrated an address recognition apparatus according to the present invention implemented as an address recognition card 10 coupled to a line card 12 by a backplane bus 14. The address recognition card 10 comprises an address recognition engine 100 coupled to a request/response RAM 101, a look-up database 300 and a table 102. The address recognition engine 100 is also coupled to a bus interface 103 for coupling to the backplane bus 14. As illustrated in FIG. 1, the bus interface 103 also couples the RAM 101 to the bus 14.

The line card 12 comprises a line interface 200 coupled to each of a RAM 203 and a plurality of data transmission lines 202 and a processor 201 coupled to the RAM 203, a table 205 and a bus interface 204. The bus interface 204 is used to couple the processor 201 to the backplane bus 14. The data transmission lines 202 are each adapted for coupling to a data transmission service used to transmit data packets in a computer network (not illustrated). The line interface 200 receives and transmits data packets to and from the data transmission lines, as will appear.

The backplane bus 14 comprises a high performance asynchronous bus operating with the bus interfaces 103, 204 according to the Futurebus IEEE Backplane Bus Specification (ANSE/IEEE Std 896.1) to provide communication services between the line card 12 and the address recognition card 10.

The line interface 200 provides the physical and electrical connectivity to the data transmission lines 202 for bit transmission. For example, the line interface 200 is coupled by a distribution panel or adapter cable to RS232, RS422/449, V.35 or X.21 leased telephone lines and is adapted to transmit and receive serial bits of a data packet according to the electrical and physical specification of the leased line. In addition, the line interface 200 formats the serially transmitted bits into data packets according to the data link protocol utilized in the respective transmission service, as for example one of the standard HDLC, LAPB or PPP data links.

The processor 201 performs data link and network layer routing or bridging processing required upon reception or for transmission of each data packet by the line interface 200 via the transmission lines 202. The RAM 203 is utilized as a buffer memory between the line interface 200 and the processor 201 to store data packets. The RAM 203 can be divided into buffer sections with each section being dedicated for use as a buffer in connection with data packets received from or to be transmitted by one of the transmission lines 202.

The network layer processing is performed by the processor 201 according to the network layer protocols utilized in the computer network or networks coupled to the transmission lines, as for example, one of the OSI, IP and DECnet network protocols, the IS—IS multi-protocol routing scheme and/or a bridging protocol. The processor 201 analyzes the format of each data packet to determine the network layer protocol to be used for that data packet. For example, as described above, the header of a framed data packet includes an identification of the protocol used in the network coupled to the transmission line 202 where the data packet was received. The processor 201 uses the protocol information as an index to the table 205 to locate an index to a database specifier. The database specifier provides control information for the address recognition engine 100, as will be described below.

The address recognition engine 100 provides a network information look-up service for the line card 12. For each data packet received by the line card 12, the processor 201 extracts the network destination address and passes the address, together with the database specifier index as a "request" to the request/response RAM 101. The address recognition engine 100 reads each request in the request/response RAM 101 and uses the database specifier index and the address contained in the request as an index to the table 102 and database 300, respectively, for lookup of a corresponding entry. A portion of the corresponding entry is placed in the request/response RAM 101 as a "response" that is then read by the processor 201. The response includes network information that indicates which transmission line 202 is to get the data packet corresponding to the request/response for transmission out of line card 12.

The requests and responses are communicated between the line card 12 and the RAM 101 over the bus 14 using a device interlocking scheme implemented in the request/response RAM 101. For example, an "ownership" interlock scheme is implemented in the RAM 101 so that the processor 201 will write a request into an addressed location of the RAM 101 only when the processor 201 "owns" that location. The processor 201 relinquishes ownership once it writes a request into a particular location. The address recognition engine 100 returns the ownership to the processor 201 after it has read the information in the particular location and proceeds to process the request. The processor 201 will not be able to write additional requests once it has relinquished ownership of all of its allocated locations until the address recognition engine 100 returns ownership for at least one location in the request/response RAM 101.

Referring now to FIG. 2, there is illustrated a memory map for the look-up database 300 of the address recognition engine 100. As described above, the address recognition engine 100 uses a network address that is stored in the request portion of an entry in the request/response RAM 101 as an index to the database 300 to locate an entry in the database 300. The entry in the database 300 contains the network information relating to the network address that is returned by the address recognition engine 100 to the request/response RAM 101 as a response. The processor 201 in the line card 12 utilizes the response to process the network information for transmission of the data packet to its intended destination.

The database 300 is divided into a primary database 301 and a secondary database 302. The primary database 301 comprises a multiway tree data structure (TRIE), as will be described below, wherein the network address is used to locate a pointer to an entry in the secondary database 302. The entry in the secondary database 302 includes the network information for the response.

An example of a request 303 is shown in FIG. 3. The request 303 comprises a 16 bit network address 303A and a database specifier index field 303B.

The address recognition engine 100 maintains the table 102 as a look-up table for database specifiers used in the control of a look-up operation in the look-up database 300, as will be described below. The index field 303B in the request input to the address recognition engine 100 provides an index to the table 102 to locate a look-up database specifier that is to be used in a current response look-up.

The address recognition engine 100 reads the address 303A from the request/response RAM 101 and processes the address 303A in groups of four bits. Each group of four bits is referred to as a digit 304. The primary database 301 comprises a plurality of nodes 305 linked to one another by node pointers 306 with each node 305 being associated with a particular value for a digit or sequence of digits of a network address. Generally, each node 305 comprises 16 node pointer entries 306, one for each unique bit combination value of a four bit digit 304 that follows in sequence the digit or sequence of digits associated with the respective node 305 ($2^4$ equals 16, 0000 to 1111), as shown in FIG. 4.

The address recognition engine 100 will first access the primary database 301 using a root pointer address 308 that points to the root node 305A of the primary database 301. The root pointer address is identified in the database specifier being used by the address recognition engine 100, as will appear. The root node 305A includes 16 node pointers 307, each including, for example, the address of one of the nodes associated with the digits having bits of the first digit equal to 0000 to 1111, respectively. The address recognition engine 100 will utilize the node pointer 307 associated with the value of the bits of the first digit 304 that matches the value of the first digit of the network address being processed, for example bits of the first digit equal to 0000, to access the next node.

In the example of FIG. 4, the node 305 associated with the digit 304 including bits equal to 0000 has 16 node pointers 307, including a node pointer 307 that is an address to a further node 305 associated with one of the values of the combination of bits for the next digit 304 of the network address, wherein the bits of the next digit equal 0000 and so on.

The primary database 301 is constructed in this manner so that each possible value for a digit 304 (e.g. the digit comprising bits 0–3) is linked to every possible digit value in the sequence of digits 304 that can comprise a network address (e.g. the digits comprising bits 4–7, 8–11 and 12–15) through the 16 node pointers 307 in each node 305. The address recognition engine 100 will traverse the primary database 301 from node to node via the node pointers 307 for the digit values that match the corresponding digit values of the network address being processed until all of the digits have been matched.

Each node 305 that points to a next node 305 in the sequence of digits of the network address is called a transition node (i.e. a node that points to another node). The nodes associated with the digits comprising the lowest four order bits of a network address are called termination nodes 305B since a match with bits of a last digit completes the match process for the 16 bit network address of this example. Each termination node 305B comprises 16 look-up match pointers 309, one for each of the 16 possible values for the digit 304 comprising bits 12–15. Each look-up match pointer 309 comprises an address to an entry in the secondary database 302.

In view of the sparsely populated address spaces frequently encountered in networks, the nodes 305 are provided with prefix strings 310 to reduce the amount of memory space required for the primary database 301 and to decrease the search time. A sparsely populated space means that only a relatively few of the total number of bit values that can be represented by an n bit network address actually form an address for a component in the network. A prefix string is a string of digits that is common to many addresses. As should be understood, there may be a large number of common digits in a sparsely populated address space.

For example, a 16 bit network address can uniquely identify over 65,000 network components. However, the network utilizing the 16 bit address may only have 16 components, each of which can be uniquely identified by one of the 16 possible values of the lowest order digit of the address. This is an example of a sparsely populated address space and the values of the three higher order digits for all of the 16 components may be the same.

Thus, in this example, a prefix string can comprise a string of the three higher order digits used for a comparison to the three higher order digits of a network address being processed in a single node 305. The use of prefix strings will minimize the total memory space required to implement the primary database 301 since fewer total nodes 305 will be required to search a particular network address. The address recognition engine 100 will compare three digits of an address in the node 305 associated with the prefix string. An OSI network protocol address is 20 bytes long for a total of 40 digits. Certain high order digits, for example the 16 highest order digits of many addresses in the network, may be the same for many components in a particular OSI network and these digit values can be stored as prefix strings in associated nodes of the primary database for a single node comparison by the address recognition engine 100.

Figure 5:
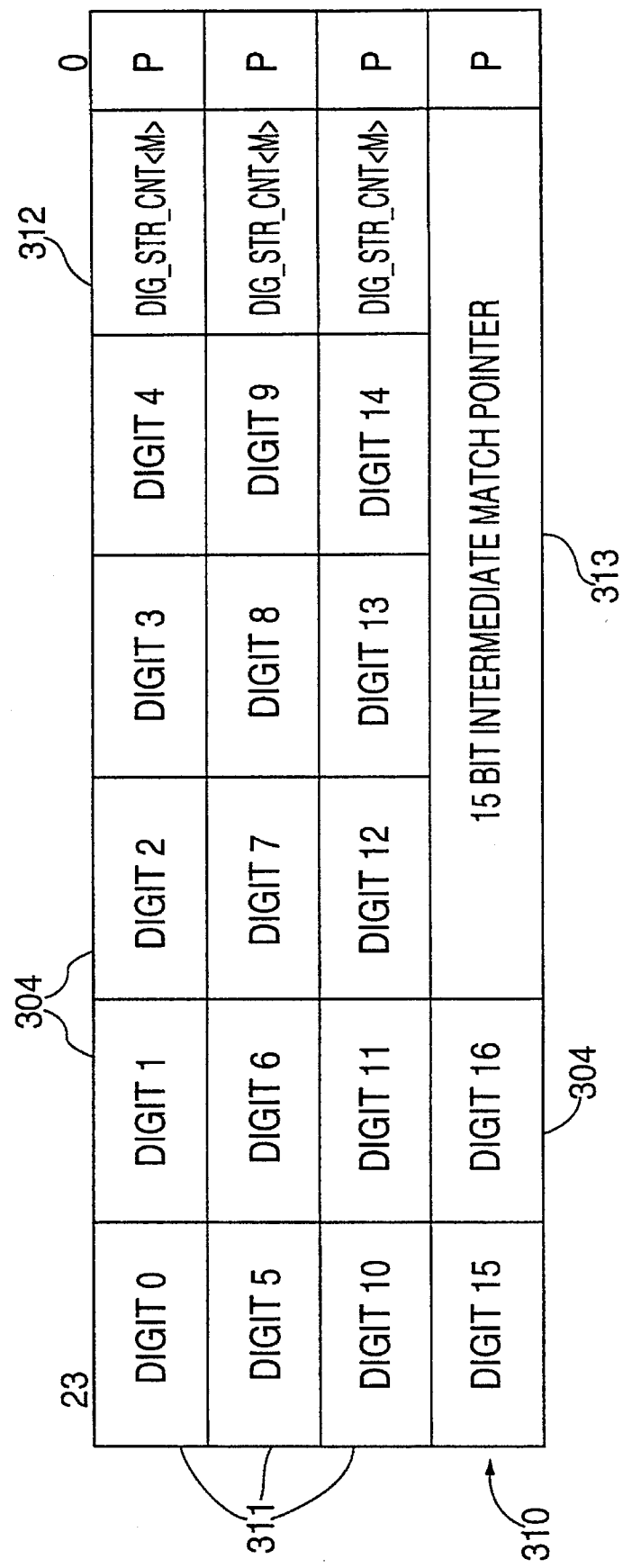
FIG. 5 illustrates an exemplary structure for a prefix string for a node of the primary database of FIG. 4.

FIG. 5 illustrates an exemplary data structure that can be used as a prefix string 310 in a node 305. The prefix string 310 is divided into four words 311. The first three words 311 each comprise five digits 304 and three control bits designated as DIG_STR_CNT 312 in bits 0–2 of the word. The control bits indicate which digits of the word are valid for comparison purposes, as will appear. The fourth word comprises two digits and an intermediate match pointer 313.

The control bits DIG_STR_CNT 312 are used to make the prefix string 310 flexible so that the prefix string 310 can represent a string of from one to 17 digits, according to the address space population of the protocol used in a particular network. The DIG_STR_CNT bits 312 for a word 311 are interpreted by the address recognition engine 100, as follows:

DIG_STR_CNT bits 312 equal 000: all five digits are valid and further digits in the next word 311 are also valid (the control for valid digits in the next word are contained in the DIG_STR_CNT bits, 312 for the next word);

DIG_STR_CNT bits 312 equal 001–101: this is the last word of the string and the value of the DIG_STR_CNT bits indicates the number of valid digits in this word;

DIG_STR_CNT bits 312 equal 110: all five digits are valid and the first digit of the next word is valid and the first digit of the next word is the last digit of the string;

DIG_STR_CNT bits 312 equal 111: all five digits are valid and the first two digits of the next word are valid and the first two digits of the next word are the last digits of the string.

The DIG_STR_CNT bits 312 are set and the digits of a string are loaded into the prefix string structure 310 of a node 305 to form a string of digits that the address recognition engine 100 can compare with the corresponding digits of the network address being processed. The digit in the address after the string is used as an index into node pointers for continuation of the traversal of the primary database 301. For maximum flexibility, each node 305 of the primary database 301 is provided with a prefix string data structure 310 which is either used or not used depending on the address scheme used in a network. The intermediate match pointer 313 is used to locate an entry in the secondary database 302 for a best match location when an exact match cannot be found, as will be described below.

Figure 6:
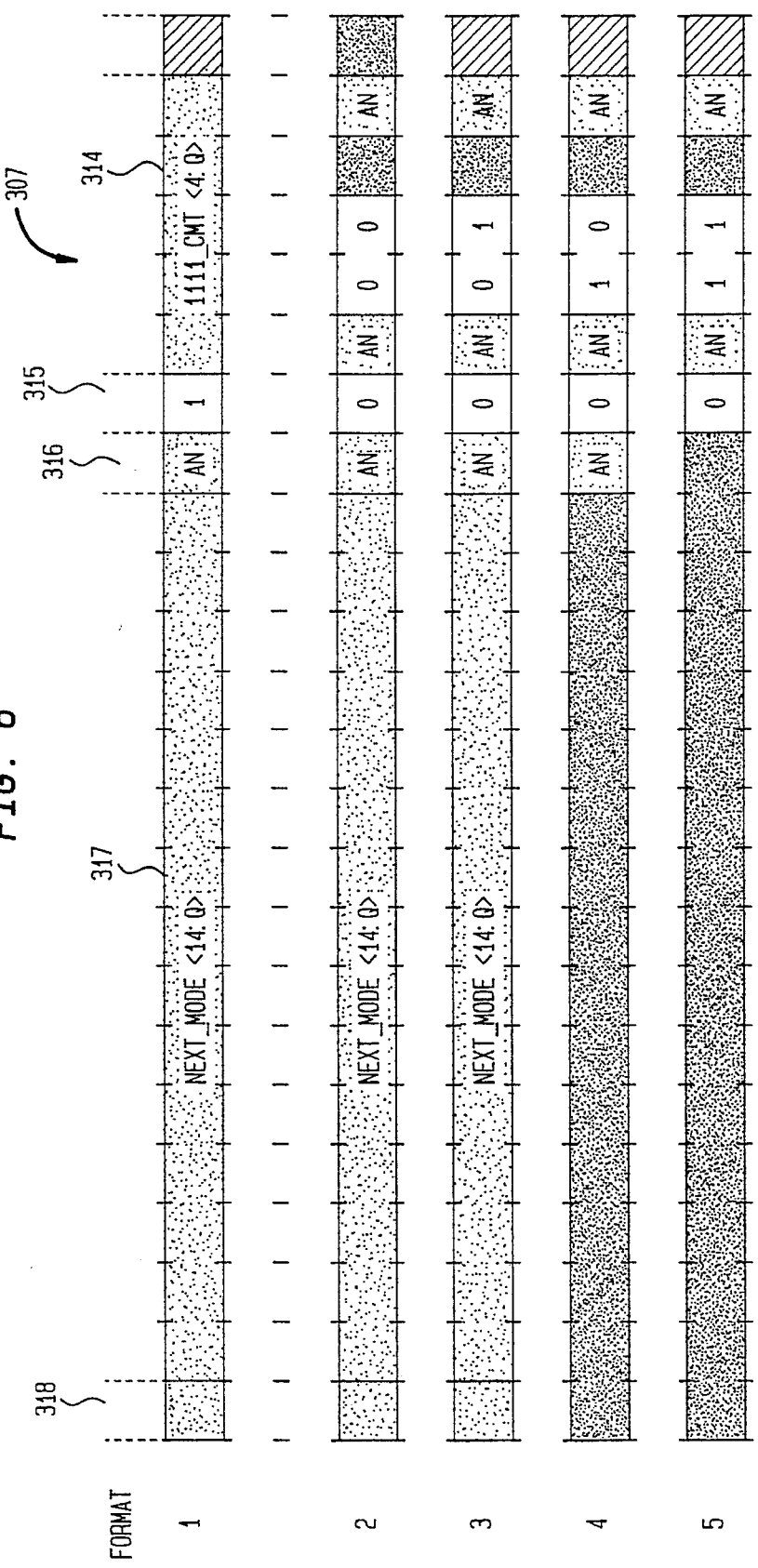
FIG. 6 is a block diagram for a node pointer of one of the nodes of the primary database of FIG. 4.

Each node pointer 307 includes a next node address and control fields to control the traversal of the primary database 301 by the address recognition engine 100. An example of a node pointer 307 is shown in FIG. 6. An IDI_CNT field 314 comprises five bits, a LOAD_IDI field 315 comprises one bit, a SAVE_RESULT field 316 comprises one bit, a NEXT_NODE field 317 comprises 15 bits and a PTR_CTRL field 318 comprises two bits.

The NEXT NODE field 317 contains the address for the next node 305 in the digit match traversal of the primary database 301.

The SAVE_RESULT field 316 is used in best match routing. In certain routing protocols, it is necessary to find the best match for a network address when an exact match cannot be found via the nodes 305 of the primary database 301. The SAVE_RESULT bit 316 is set in a node pointer 307 when a best match for an address is valid at the digit 304 of the address associated with the node 305 pointed to by the node pointer 307. When the SAVE_RESULT bit 316 is set, the address recognition engine 100 saves the value of the NEXT_NODE field 317 in an internal register. The stored NEXT_NODE value is an address to a next node 305 whose intermediate match pointer 313 is used as a pointer to the secondary database 302 should a best match be necessary (i.e. upon continuation of the traversal of the primary database 301, when no exact match is found for the address being processed, the address recognition engine 100 uses the stored NEXT_NODE value to access the intermediate match pointer for access to the secondary database 302).

In addition, certain network addresses are divided into segments according to, e.g., the IS—IS routing protocol. The International Organization for Standardization (ISO), for example, defines a hierarchial address structure comprising an initial domain part (IDP) and a domain specific part (DSP). The transition from the IDP portion to the DSP portion of an ISO formatted address does not follow the tree structure of the primary database 301.

Accordingly, the IDI_CNT field 314 and the LOAD_IDI field 315 are used to redirect a traversal of the primary database 301 at the digit of an ISO address where the IDP portion ends. When the bit of the LOAD_IDI field 315 is set in a node 305, the IDI_CNT field 314 will contain the number of digits from the current digit to the digit at the end of the IDP portion of the address. The address recognition engine 100 will store the value in the IDI_CNT field 314 (IDI count) and decrement the IDI count value for each subsequent node 305 until the value equals zero. At the node where the IDI count equals zero, the address recognition engine 100 will move to a next node 305 using an address stored in a DSP pointer 307A provided at the node 305 (see FIG. 4). The DSP pointer 307A points to a node that continues the traversal for an ISO address.

When the bit of the LOAD IDI field 315 is not set, and a preselected one of the bits in the IDI_CNT field 314 is set, this will be interpreted as an Area Match (AM) bit set. Certain protocols, e.g. the DECnet/OSI and DECnet/Phase IV protocols, define an area address. When the AM bit is set on a node 305, this indicates that the end of an area address is valid at this digit. The continuation of the traversal of the primary database 301 after encountering a node 308 having a set AM bit will be described below.

The bits of the PTR_CTRL field 318 provides the address recognition engine 100 with information on the next node 305 pointed to by the NEXT_NODE field 317. The bits of the PTR_CTRL field 318 are interpreted, as follows:

PTR_CTRL bits equal 00: the next node does not contain a prefix string; as described above, each node is provided with a prefix string structure, when the PTR_CTRL bits are 00, the prefix string structure of the next node is not used and the 00 bits tell the address recognition engine 100 to ignore the structure in the next node;

PTR_CTRL bits equal 01: the next node contains a prefix string, accordingly, the address recognition engine 100 will compare the corresponding digits of the address being processed to the valid digits of the string, as indicated by the DIG_STR_CNT bits 312 of the prefix string 310;

PTR_CTRL bits equal 10: the next node is a "padding" entry, this tells the address recognition engine 100 to reuse the current node 305 because padding digits exist in the address, the padding digits are stripped from the address and the traversal continues[1], the NEXT_NODE field 317 is ignored;

PTR_CTRL bits equal 11: the pointer indicates a look-up-fail, the pointer indicates that the intermediate match pointer saved from the node where the SAVE_RESULT bit was set should now be used to access the secondary database, the NEXT_NODE field 317 is ignored.

When a termination node 305B is reached, the address recognition engine 100 will access the secondary database 302 with the appropriate look-up match pointer 309. The address recognition engine 100 will retrieve information from a corresponding secondary database entry according to control bits of the look-up database specifier indicated by the look-up type field 303B of the respective request, as will appear. If the PTR_CTRL bits of the node pointer 305 to the termination node 305B indicate that the termination node contains a string, then the address recognition engine 100 must compare the remaining digits of an address being processed with the string. If a match occurs, the corresponding look-up match pointer 309 of the termination node 305 is used to access the secondary database 302. If there is no match or if there are less digits remaining in the address than in the string, then the intermediate match pointer saved from the node 305 where the SAVE_RESULT bit was set is

[1] The IDI field of the IDP portion of an OSI standard address is right justified and padded to fill the fixed length of the field. The padding digits are looped back to the current node 305 using the padding pointers. used to access the secondary database 302.

Figure 7:
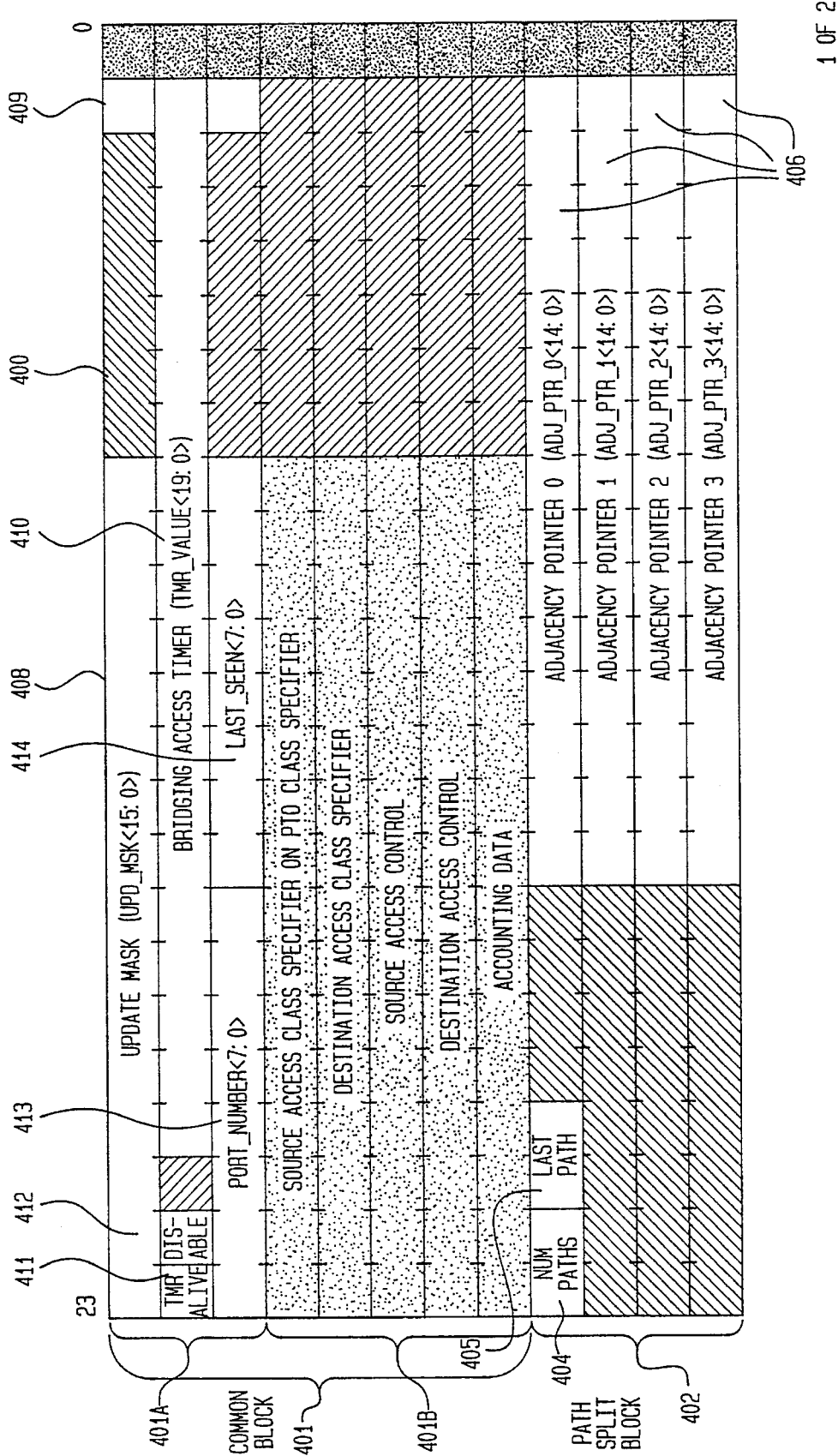
FIG. 7 illustrates an exemplary format for an entry in the secondary database of FIG. 2.
Figure 7:
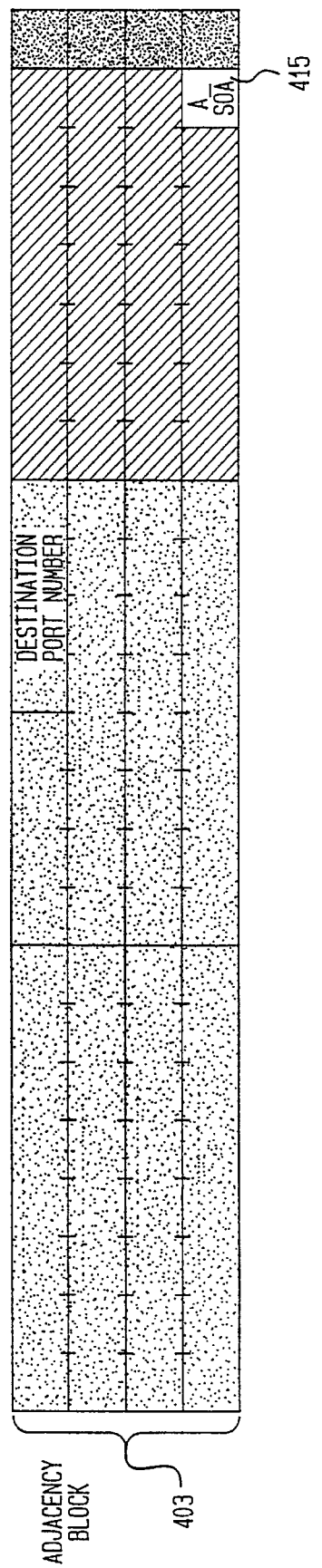

Referring now to FIG. 7, there is illustrated an exemplary format for a secondary database entry 400. There are three types of secondary database entries 400: a common block 401, a path split block 402 and an adjacency block 403. Each common block 401 is linked to a path split block 402. There are an equal number of common, path split and adjacency blocks 401, 402, 403 in the secondary database 302. There is no direct relationship between each linked common block/path split block and the adjacency blocks. Each of the common and adjacency blocks 401, 402 contains information to be returned by the address recognition engine 100 as a response to the request/response RAM 101.

Each common block 401 is eight words long. The first three words 401A are used to maintain ageing and learning information required when the destination of a data packet is reached using a bridge, as will be described below. The remaining five words 401B are uncommitted and are used to store any information that may be required for return in a response, as for example routing information for OSI or DECnet network protocols, etc. Each of the look-up match 309 and intermediate look-up 313 pointers of the primary database 301 index a corresponding common block 401.

Each path split block 402 is linked to a respective common block 401 and comprises a group of four pointers used to select an adjacency block 403 for use in a current response.

Each adjacency block 403 is four words long. The words of each adjacency block 403 also contain information that may be required in a response. Successive look-up's to the same common block 401 of the secondary database 302 may each return information from a different adjacency block 403 depending upon the path splitting operation.

Each path split block 402 includes a NUM_PATHS field 404 comprising two bits, a LAST_PATH field 405 comprising two bits and four adjacency block pointers 406, each comprising 15 bits designated ADJ_PTR_0 to ADJ_PTR_3, respectively. Each adjacency block pointer 406 points to a respective adjacency block 403. The bits of the NUM_PATHS field 404 are interpreted by the address recognition engine 100, as follows:

NUM_PATHS bits equal 00: one adjacency block only is accessed through the path split block 402, as indicated by ADJ_PTR_O;

NUM_PATHS bits equal 01: one of two different adjacency blocks is accessed through the path split block 402, as indicated by either ADJ_PTR_0 or ADJ_PTR_1;

NUM_PATHS bits equal 10: one of three different adjacency blocks is accessed through the path split block 402, as indicated by one of ADJ_PTR_0 to ADJ_PTR_2;

NUM_PATHS bits equal 11: one of four different adjacency blocks is accessed through the path split block 402, as indicated by one of ADJ_PTR_0 to ADJ_PTR_3.

The LAST_PATH field 405 indicates the number of the adjacency block pointer 406 to use during a current retrieval of information from the secondary database 302 for a response. The bits of the LAST_PATH field 405 are interpreted by the address recognition engine 100, as follows:

LAST_PATH bits equal 00: utilize ADJ_PTR_0 for the current response;

LAST_PATH bits equal 01: utilize ADJ_PTR_ for the current response;

LAST_PATH bits equal 10: utilize ADJ_PTR_2 for the current response;

LAST PATH bits equal 11: utilize ADJ_PTR_3 for the current response.

Each time the address recognition engine 100 enters a path split block 402, it increments the LAST_PATH field 405. If the value of the bits in the LAST_PATH field 405 exceeds the value of the bits in the NUM_PATHS field 404 of the path split block 402, then the LAST_PATH field 405 is set to zero. Thus, the value of the bits in the LAST_PATH field 405 cycles from 0 to the value of the bits in the NUM_PATHS field 404 of the path split block 402.

The path splitting operation provided by the path splitting block 402 provides automatic control of routing information changes that may be desired in a particular routing protocol on successive transmissions of data packets to a particular network address. The NUM_PATHS and LAST_PATH fields 404, 405 can be utilized to set a number of different adjacency blocks to be accessed on successive reads of a particular common block 401 and to control which adjacency block is read during a current common block read.

Figure 8:
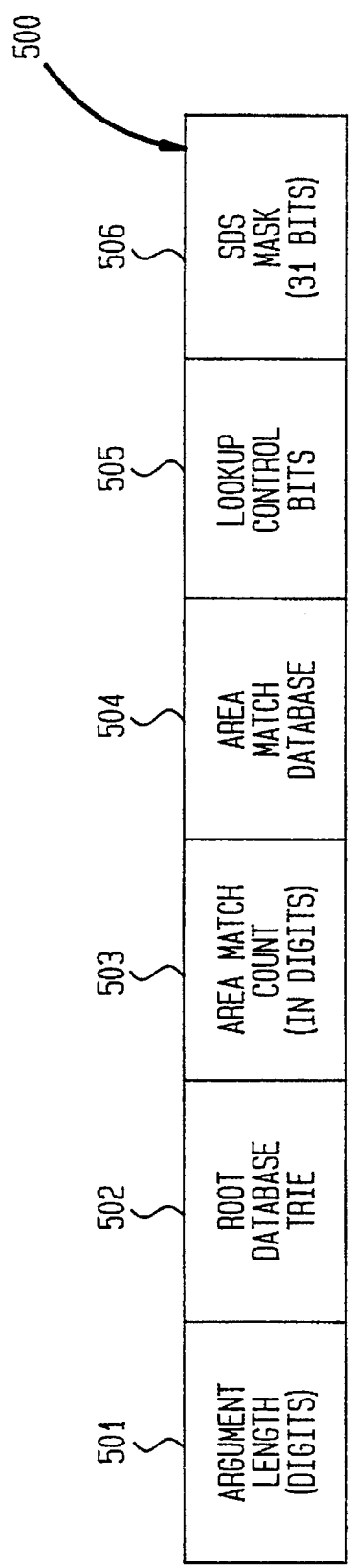
FIG. 8 illustrates an exemplary format for a look-up database specifier of the address recognition engine of FIG. 1.

Referring now to FIG. 8, there is shown an exemplary format for a look-up database specifier 500. As discussed above, the address recognition engine 100 maintains a table 102 of look-up database specifiers 500, e.g. 24 look-up database specifiers 500. In processing a specific request, the address recognition engine 100 proceeds to traverse the primary database 301 and retrieve information from the secondary database 302 according to control bits set in a particular look-up database specifier 500 indicated by the processor 201 in the look-up type field 303B of the request 303 (see FIG. Different protocols require different address formats and other items, such as protocol class, that may be stored in the common block 401 and related adjacency blocks 403 of the secondary database entry 400 pointed to in the processing of a particular request. The look-up database specifiers provide a mechanism for controlling what information is returned in a response.

Each look-up database specifier 500 comprises six fields: an argument length field (ARG_LENGTH) 501 comprising 6 bits, a root database TRIE field (ROOT_TRIE) 502 comprising five bits, an area match count field (AM_CNT) 503 comprising six bits, an area match root database TRIE field 504 (AM_TRIE) comprising five bits, a look-up control bits field 505 including a preselected number of look-up control bits, and a secondary database mask (SDB_MASK) 506 comprising 31 bits.

The argument length field 501 indicates the number of digits in the address portion 303A of a particular request 303 (see FIG. 3). As discussed above, the network addresses written as requests into the request/response RAM 101 can be fixed length or vary in length, depending upon the network protocol associated with each particular address.

The root database TRIE field 502 specifies which root transition node is to be used in the primary database 301. The primary database 301 can be implemented with a plurality of roots, each used to commence a search for a secondary database look-up match pointer 309. Thus, the number set in the ROOT_TRIE field 502 is used by the address recognition engine 100 to determine at which root the search should begin.

The area match count field 503 indicates the number of remaining digits beyond the digit indicated by a set AM bit to complete an area, as described above, for an area transition within the primary database 301. The area match root TRIE field 504 indicates the root node 305 of the primary database 301 to be used for the remaining area-match-count digits of the address.

If the AM bit is set in a node pointer 307 and the number of digits remaining in an address being processed equals the value in the area match count field 503 of the look-up database specifier 500 indicated in the request 303, then a transition is made to the root node specified by the area match root TRIE field 504 of that look-up database specifier 500. The next digit of the address being processed is used for matching in the specified root node. If the number of remaining digits is not equal to the area match count value or if the AM bit is not set in a node pointer 307, then the next digit is looked up in the node pointed to by NEXT_NODE field 317 of the node pointer 307.

The look-up control bits field 505 can include various bits used to control the operation of the address recognition engine 100 during a look-up operation. For example, a look-up disable bit can be provided to disable a look-up type specified by the associated look-up database specifier 500. When set, an error is returned if the associated look-up database specifier 500 is indicated in the look-up type field 303B of a request.

The address recognition engine of the present invention is adapted to support both routing and bridging protocols. As described above, each common block 401 includes three words 401A reserved for ageing and learning information necessary for the implementation of a bridging protocol. A port learning and ageing bit is included in the look-up control bits field 505 to indicate to the address recognition engine 100 that a particular network destination address requires a bridging operation to transfer the respective data packet. When the port learning and ageing bit is set in a look-up database specifier 500, the following learning and ageing functions are performed by the address recognition engine 100.

The address recognition engine 100 reads the first word 401A of the common block 401 for an update mask 408 comprising 16 bits. Each bit of the update mask 408 corresponds to, e.g., one of the ports in the line card 12 that can be a source port in a bridge. For each port whose corresponding bit is set in the mask 408, a learning operation is performed. The processor 201 will include a bit number in each request to specify a particular bit in the mask 408 relating to a bridging address. The address recognition engine 100 will determine if the bit for the port number specified by the processor 201 in the request is set in the mask 408. If the specified bit is not set, learning is not performed by the address recognition engine 100 for that port. However, a timer override bit 408 is provided in the first word 401A. When each of the timer override and port learning and ageing bits are set, the address recognition engine 100 will perform the ageing function in respect of the common block 401.

Upon entry to the common block 401 for a bridging address, the address recognition engine 100 clears a bridging access timer 410 in the second word 401A to zero and sets a timer alive bit 411, also in the second word 401A. The timer field comprises 20 bits. As a background operation, the address recognition engine 100 polls each common block 401 having a set timer alive bit 411, e.g. once each second, and increments the value in the timer field 410.

The address recognition engine 100 maintains an ageing time-out value which is compared to the incremented value in the timer field 410. If the incremented value in the timer field 410 is larger than the ageing time-out value, then the timer alive bit 411 is cleared to indicate that the bridging information in the corresponding common block 401 has aged out, as understood by the bridging protocol.

The second word 401A also includes a timer disable bit 412. When the timer disable bit 412 is set, the timer field 410 is not incremented. The timer disable bit 412 is set in any common block 401 for which ageing is not to be performed. If both the timer disable bit 412 and timer alive bit 411 are set, this maintains the common block 401 as "permanently alive".

The third word 401A of the common block 401 includes a port number field 413 and a last seen field 414 used for source port learning. When the port learning and ageing bit is set and the learning operation is being performed (as indicated by the appropriate bit in the update mask 408), the address recognition engine 100 will write the source port number for a data packet into the port number field 413. The source port number is also written into the last seen field 414, whether or not the learning operation is being performed.

The look-up control bits field 505 can also include an enable adjacency set-on-access bit to indicate to the address recognition engine 100 that a set-on-access (A_SOA) bit 415 (provided in each adjacency block 403, see FIG. 7) be set when the address recognition engine 100 reads an adjacency block 403. The set-on-access bit 415 supports the address resolution protocol cache requirements of the IP network protocol. The cache requirements of the IP protocol can be implemented in the processor 201 of the line card 12. A set A_SOA bit 415 indicates to the processor 201 that the respective adjacency block 403 has been used in a routing operation.

Moreover, the control bits field 505 can be provided with an EN_PKTSEQ bit as a control to modify the path split operation described above. An additional byte is provided in the request 303 for packet sequencing. When the EN_PKTSEQ bit is set, a preselected bit of the packet sequencing byte is read. If the preselected bit is in a first state, normal path splitting operation is followed. However, if the preselected bit is in a second state, a first path is used unconditionally, e.g., ADJ_PTR_0 is used unconditionally.

The secondary database mask (SDB_MASK) 506 of each look-up database specifier 500 is used to select which bytes of data stored in the five longwords 401B of a common block 401 and the four longwords of a related adjacency block 403 are to be returned to the processor 201 in a particular response.

The first 19 bits of the mask 506 determine which bytes of the common block 401 are returned. Each byte of the common blocks 401 corresponds to one of the 19 bits. If the corresponding bit of the mask 506 is set, the byte is returned in the response. Similarly, the next 12 bits are used to determine which bytes of the adjacency block 403 are returned in the response, as a function of which of the 12 bits are set. If all of the adjacency bits of the mask 506 are zero and the enable adjacency set-on-access bit of the look-up control bits field 505 is not set, then the path split adjacency block pointers 406 are not used and the LAST_PATH field 405 is not incremented.

The various control bits of the prefix string data structures 310, the node pointers 307, the path split blocks 402 and the look-up database specifiers 500 provide maximum flexibility in the control of the traversal of the primary database 301 and the retrieval of routing or bridging information from the secondary database 302. The control bit arrangement of the address recognition engine 100 builds in device compatibility to accommodate the varying requirements of dissimilar routing and bridging protocols in a single memory structure that can provide a centralized resource to several components performing bridging or routing operations in a computer network.

What is claimed is:

1. An address recognition apparatus, which comprises:

an address recognition engine adapted to receive as an input a network address;

a network information look-up database coupled to the address recognition engine;

the network information look-up database comprising a plurality of entries, each one of the plurality of entries containing network information relating to a corresponding network address;

the address recognition engine operating to use a network address input thereto as a look-up index to the lookup database for access to and retrieval of a corresponding one of the entries;

the network information look-up database comprising a primary database and a secondary database, the plurality of entries being arranged in the secondary database, the primary database comprising a plurality of linked nodes for matching to preselected portions of a network address used as a look-up index so that the index input to the primary database traverses the linked nodes according to matches among linked nodes as a function of a sequence of the preselected portions of the network address to locate a secondary database pointer to one of the entries of the secondary database;

wherein each one of preselected ones of the plurality of linked nodes includes a controllably variable string structure for controllably matching a preselected number of p-bit digits of the network address of a request at the one node of the primary database.

the address recognition engine using the located secondary database pointer to access and retrieve the corresponding one of the entries from the secondary database.

2. The apparatus of claim 1 wherein the primary database comprises a database having a TRIE structure.

3. The apparatus of claim 1, wherein the network address comprises an n-bit field; and
wherein the address recognition engine segments the n-bit address into a plurality of m-bit digits for traversal through the primary database, each m-bit digit having one of $2^m$ distinct values.

4. An address recognition apparatus, which comprises:

an address recognition engine adapted to receive as an input a network address;

a network information look-up database coupled to the address recognition engine;

a network information look-up database comprising a plurality of entries, each one of the plurality of entries containing network information relating to a corresponding network address;

the address recognition engine operating to use a network address input thereto as a look-up index to the look-up database for access to and retrieval of a corresponding one of the entries;

the network information look-up database comprising a primary database and a secondary database, the plurality of entries being arranged in the secondary database, the primary database comprising a plurality of linked nodes for matching to preselected portions of a network address used as a look-up index so that the index input to the primary database traverses the linked nodes according to matches among linked nodes as a function of a sequence of the preselected portions of the network address to locate a secondary database pointer to one of the entries of the secondary database;

the address recognition engine using the located secondary database pointer to access and retrieve the corresponding one of the entries from the secondary database;

wherein the network address comprises an n-bit field, wherein the plurality of linked nodes includes at least one set of transition nodes and a set of termination nodes linked to each one of the at least one set of transition nodes, each of the at least one set of transition nodes being linked to a root node and each of the at least one root node and each node of the at least one set of transition nodes includes $2^m$ node pointers for linking to subsequent nodes, each one of the node pointers of one of the root and transition nodes corresponds to one of the $2^m$ distinct values and points to a subsequent one of one of the at least one set of transition nodes and the linked set of termination nodes, each one of the termination nodes includes $2^m$ secondary database pointers, each one of the secondary database pointers of one of the termination nodes corresponds to one of the $2^m$ distinct values and points to one of the entries of the secondary database, the digits of the network address being matched, one at a time, in a preselected sequence of digits, to a corresponding sequence of linked node pointers of a root node and subsequent transition nodes to traverse the primary database to one of the termination nodes, and wherein each one of preselected ones of the plurality of linked nodes includes a controllably variable string structure for controllably matching a preselected number of p-bit digits of the network address of a request at the one node of the primary database.

5. The apparatus of claim 4 wherein the address recognition engine includes a set of database specifiers, each of the database specifiers including a root field containing root node information to indicate to the address recognition engine the root node at which to commence a traversal of the primary database; the address recognition engine being controlled to select one of the database specifiers prior to input of an index to the primary database.

6. An address recognition apparatus, which comprises:

an address recognition engine adapted to receive as an input a network address;

a network information look-up database coupled to the address recognition engine;

a network information look-up database comprising a plurality of entries, each one of the plurality of entries containing network information relating to a corresponding network address;

the address recognition engine operating to use a network address input thereto as a look-up index to the look-up database for access to and retrieval of a corresponding one of the entries;

the network information look-up database comprising a primary database and a secondary database, the plurality of entries being arranged in the secondary database, the primary database comprising a plurality of linked nodes for matching to preselected portions of a network address used as a look-up index so that the index input to the primary database traverses the linked nodes according to matches among linked nodes as a function of a sequence of the preselected portions of the network address to locate a secondary database pointer to one of the entries of the secondary database;

the address recognition engine using the located secondary database pointer to access and retrieve the corresponding one of the entries from the secondary database;

wherein the network address comprises an n-bit field;.

wherein the plurality of linked nodes includes at least one set of transition nodes and a set of termination nodes linked to each one of the at least one set of transition nodes, each of the at least one set of transition nodes being linked to a root node and each of the at least one root node and each node of the at least one set of transition nodes includes $2^m$ node pointers for linking to subsequent nodes, each one of the node pointers of one of the root and transition nodes corresponds to one of the $2^m$ distinct values and points to a subsequent one of one of the at least one set of transition nodes and the linked set of termination nodes, each one of the termination nodes includes $2^m$ secondary database pointers, each one of the secondary database pointers of one of the termination nodes corresponds to one of the $2^m$ distinct values and points to one of the entries of the secondary database, the digits of the network address being matched, one at a time, in a preselected sequence of digits, to a corresponding sequence of linked node pointers of a root node and subsequent transition nodes to traverse the primary database to one of the termination nodes; and wherein each of the node pointers further comprises control information for use by the address recognition engine to redirect traversal of the primary database at a preselected one of the digits.

7. The apparatus of claim 6, wherein each of the transition nodes includes a $2^m+1$ node pointer, and the control information includes an IDI_CNT field and a LOAD_IDI field;

the LOAD_IDI field representing one of a set state and a clear state, the set state indicating to the address recognition engine that the traversal of the primary database is to be redirected at a preselected one of the digits and the clear state indicating to the address recognition engine that traversal of the primary database is to continue without redirection, the IDI_CNT field contains an integer that indicates to the address recognition engine the preselected one of the digits at which the traversal is to be redirected; the $2^m+1$ node pointer points to another one of the set of transition nodes for redirection of traversal by the address recognition engine when a digit to be matched at the respective transition node is a preselected one of the digits as indicated in an IDI_CNT field of a previous transition node.

8. The apparatus of claim 6, wherein the control information includes an area match information field, the area match information field representing a set state and a clear state, the set state indicating to the address recognition engine that the traversal of the primary database is to be redirected at a preselected one of the digits and the clear state indicating to the address recognition engine that the traversal of the primary database is to continue without redirection; and wherein the address recognition engine includes a set of database specifiers, each of the database specifiers including control information for redirecting the traversal of the primary database when the area match information in one of the node pointers matching a digit of the network address is in the set state; the address recognition engine being controlled to select one of the database specifiers prior to input of an index to the primary database.

9. The apparatus of claim 8, wherein the control information of each one of the database specifiers includes an area match count field and an area match root field, each area match count field indicates to the address recognition engine the preselected one of the digits at which a redirection of traversal of the primary database is to occur when the area match information at any one digit of the index is in the set state, and each area match root field indicates to the address recognition engine a preselected node of the primary database where the traversal of the primary database is to continue for remaining subsequent digits of the index.

10. An address recognition apparatus, which comprises:

an address recognition engine adapted to receive as an input a network address;

a network information look-up database coupled to the address recognition engine;

a network information look-up database comprising a plurality of entries, each one of the plurality of entries containing network information relating to a corresponding network address;

the address recognition engine operating to use a network address input thereto as a look-up index to the look-up database for access to and retrieval of a corresponding one of the entries;

the network information look-up database comprising a primary database and a secondary database, the plurality of entries being arranged in the secondary database, the primary database comprising a plurality of linked nodes for matching to preselected portions of a network address used as a look-up index so that the index input to the primary database traverses the linked nodes according to matches among linked nodes as a function of a sequence of the preselected portions of the network address to locate a secondary database pointer to one of the entries of the secondary database;.

the address recognition engine using the located secondary database pointer to access and retrieve the corresponding one of the entries from the secondary database;

wherein the network address comprises an n-bit field;

wherein the plurality of linked nodes includes at least one set of transition nodes and a set of termination nodes linked to each one of the at least one set of transition nodes, each of the at least one set of transition nodes being linked to a root node and each of the at least one root node and each node of the at least one set of transition nodes includes $2^m$ node pointers for linking to subsequent nodes, each one of the node pointers of one of the root and transition nodes corresponds to one of the $2^m$ distinct values and points to a subsequent one of one of the at least one set of transition nodes and the linked set of termination nodes, each one of the termination nodes includes $2^m$ secondary database pointers, each one of the secondary database pointers of one of the termination nodes corresponds to one of the $2^m$ distinct values and points to one of the entries of the secondary database, the digits of the network address being matched, one at a time, in a preselected sequence of digits, to a corresponding sequence of linked node pointers of a root node and subsequent transition nodes to traverse the primary database to one of the termination nodes;

wherein each one of the transition nodes includes an intermediate secondary database pointer for use by the address recognition engine for a best match result; and wherein each one of the node pointers further comprises a SAVE_RESULT field representing one of a set state and a clear state, the set state indicating to the address recognition engine that an intermediate secondary database pointer of a preselected transition node is to be used as a best match result.

11. The apparatus of claim 10 wherein the preselected transition node is a transition node pointed to by a node pointer having a SAVE_RESULT field in the set state.

12. The apparatus of claim 10, wherein each node pointer further comprises a PTR_CTRL field to indicate when there is a look-up-fail-use-best-match-result to the address recognition engine so that the address recognition engine then uses the intermediate secondary database pointer of the preselected transition node indicated by the SAVE_RESULT field in the set state, for access to and retrieval of an entry of the secondary database.

13. An address recognition apparatus, which comprises:

an address recognition engine adapted to receive as an input a network address;

a network information look-up database coupled to the address recognition engine;

a network information look-up database comprising a plurality of entries, each one of the plurality of entries containing network information relating to a corresponding network address;

the address recognition engine operating to use a network address input thereto as a look-up index to the look-up database for access to and retrieval of a corresponding one of the entries;

the network information look-up database comprising a primary database and a secondary database, the plurality of entries being arranged in the secondary database, the primary database comprising a plurality of linked nodes for matching to preselected portions of a network address used as a look-up index so that the index input to the primary database traverses the linked nodes according to matches among linked nodes as a function of a sequence of the preselected portions of the network address to locate a secondary database pointer to one of the entries of the secondary database:

the address recognition engine using the located secondary database pointer to access and retrieve the corresponding one of the entries from the secondary database;

wherein the network address comprises an n-bit field, wherein the plurality of linked nodes includes at least one set of transition nodes and a set of termination nodes linked to each one of the at least one set of transition nodes, each of the at least one set of transition nodes being linked to a root node and each of the at least one root node and each node of the at least one set of transition nodes includes $2^m$ node pointers for linking to subsequent nodes, each one of the node pointers of one of the root and transition nodes corresponds to one of the $2^m$ distinct values and points to a subsequent one of one of the at least one set of transition nodes and the linked set of termination nodes, each one of the termination nodes includes $2^m$ secondary database pointers, each one of the secondary database pointers of one of the termination nodes corresponds to one of the $2^m$ distinct values and points to one of the entries of the secondary database, the digits of the network address being matched, one at a time, in a preselected sequence of digits, to a corresponding sequence of linked node pointers of a root node and subsequent transition nodes to traverse the primary database to one of the termination nodes, and wherein each one of preselected ones of the plurality of linked nodes includes a controllably variable string structure for controllably matching a preselected number of p-bit digits of the network address of a request at the one node of the primary database.

14. The apparatus of claim 13, wherein each string structure comprises at least one word and a control field, each one of the at least one word being segmented into x m-bit digits, and the control field indicating to the address recognition engine a set of the x m-bit digits that are valid for use a s a string of digits for matching to corresponding digits of an index.

15. The apparatus of claim 13, wherein each node pointer further comprises a PTR_CTRL field to indicate to the address recognition engine whether the controllable variable string structure of a node pointed to by the respective node pointer is to be used in a match with digits of an index.

16. The apparatus of claim 13, wherein each string structure comprises a plurality of words, each of said plurality of words including a control field, and being segmented into x, m-bit digits, wherein the control fields indicate to the address recognition engine a set of the x, m-bit digits that are valid for use as a string of digits for matching to corresponding digits of an index.

* * * * *